United States Patent
Fujisaki et al.

(10) Patent No.: US 6,771,280 B2
(45) Date of Patent: Aug. 3, 2004

(54) APPARATUS AND METHOD FOR DATA-PROCESSING

(75) Inventors: Hitomi Fujisaki, Osaka (JP); Hiroyuki Asahi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 44 days.

(21) Appl. No.: 10/357,883

(22) Filed: Feb. 4, 2003

(65) Prior Publication Data

US 2003/0174149 A1 Sep. 18, 2003

(30) Foreign Application Priority Data

Feb. 6, 2002 (JP) ........................................ 2002-029491

(51) Int. Cl.[7] .................................................. G09G 5/00
(52) U.S. Cl. ........................................ 345/684; 345/687
(58) Field of Search ................................ 345/684, 685, 345/686, 687, 173, 784

(56) References Cited

U.S. PATENT DOCUMENTS 6,232,959 B1 * 5/2001 Pedersen .................... 345/161
6,330,009 B1 * 12/2001 Murasaki et al. ........... 345/784

FOREIGN PATENT DOCUMENTS

JP    2000-181617    6/2000
JP    2000-214994    8/2000

* cited by examiner

*Primary Examiner*—Matthew Luu
(74) *Attorney, Agent, or Firm*—RatnerPrestia

(57) ABSTRACT

Data-processing apparatus and method that provide continuous scrolling on a flat coordinate-input device. Coordinate-information is input by the flat coordinate-input unit. Coordinate-information acquiring unit acquires the input coordinate-information. Coordinate-information storage unit stores the coordinate-information. An angle-calculator calculates an angle defined by i) a displacement-vector between a coordinate shown by the first coordinate-information that is the latest information, and a coordinate shown by the second coordinate-information acquired previous to the latest, and ii) a displacement-vector between the coordinate shown by the second coordinate-information and a coordinate shown by the third coordinate-information acquired previous to the second. The scroll-information generator determines a direction of scrolling and an amount of scrolling from the displacement-vectors and angle. The scroll unit performs scrolling according to the scroll information.

16 Claims, 7 Drawing Sheets

APPARATUS AND METHOD FOR DATA-PROCESSING

FIELD OF THE INVENTION

The present invention relates to an apparatus and method for data-processing employing a flat coordinate-input device, in which scrolling operations can be continuously performed with less number of operations.

BACKGROUND OF THE INVENTION

Nowadays pointing devices, such as a mouse and a track ball, are widely used to interface with data-processing apparatuses including computers.

Similarly, a flat coordinate-input device typified by a track pad and a touch pad provide useful features as the pointing device. With a touch pad, a user slides a finger or a pen on the surface of the touch pad to move the cursor or the pointer shown on a display.

When the touch pad is employed, the screen is scrolled up or down by the procedures below, basically the same as is the case of using a mouse.

1) the user's finger sliding on the touch pad moves the pointer onto a scroll box or a scroll button of a scroll bar.

2) the touch-pad is tapped, for example, and the scroll button or scroll bar, which is under drag-operation, is moved.

3) the scroll is performed according to the movement of the scroll button or scroll bar which is under drag-operation.

A flat coordinate-input device, in which its surface has an area dedicated to scrolling the image on the display regardless of the pointer, is introduced. In such a flat coordinate-input device, the user slides a finger or the like within the predetermined area on the flat coordinate input device. The sliding operation performs the scroll corresponding to displacement of the finger.

The predetermined area dedicated to scrolling may be disposed at lengthwise and widthwise edges of the surface. In this case, the user operates the lengthwise edge for the lengthwise scroll, and operates the widthwise edge for the widthwise scroll.

In the conventional flat coordinate-input device, however, the scrolling operation has been limited in the predetermined area in the device. Furthermore, the amount of scrolling is proportional to the displacement of the finger or the like. Under the constraints, when the scroll is continuously performed, the user has to repeatedly make the scrolling operation within the limited area in the device. The operation with constraints may not be user-friendly.

SUMMARY OF THE INVENTION

The apparatus of the present invention includes a) a flat coordinate-input unit, b) a coordinate-information acquiring unit, c) a coordinate-information storage unit, d) an angle calculator, e) a scroll-information generator, and f) a scroll unit.

(a) the flat coordinate-input unit inputs coordinates into the apparatus.

(b) the coordinate-information acquiring unit acquires coordinate-information including the coordinate fed from the flat coordinate-input unit.

(c) the coordinate-information storage unit stores in sequence the coordinate-information.

(d) the angle calculator calculates an angle defined by a first displacement-vector and a second displacement-vector—where, the first displacement-vector represents a displacement from the coordinate given by a second coordinate information to the coordinate given by a first coordinate information; the second displacement-vector represents a displacement from the coordinate given by a third coordinate information to the coordinate given by the second coordinate information. In the calculation above, the newest information is stored as the first coordinate information, and the information acquired previous to the newest is stored as the second coordinate information, similarly, the information acquired previous to the second is stored as the third coordinate information.

(e) the scroll-information generator determines the direction of scroll according to the angle calculated above, and determines the amount of scroll according to the first-displacement vector, thereby generating scroll information.

(f) the scroll unit performs the scroll according to the scroll information above.

In this way, the scrolling operation can be continued on any given coordinates on the coordinate-input unit. Besides, a desired amount of scrolling can be obtained with no regard to the coordinate representing the center of rotating operation or distance of finger sliding. This provides the user with simple and speedy scrolling.

The data-processing apparatus of the present invention further includes a coordinate-information updating unit.

In the process of acquiring coordinate information by the coordinate-information acquiring unit, the coordinate-information updating unit deletes the oldest one in the coordinate information stored in the coordinate-information storage unit and then adds another coordinate-information that is newly acquired by the coordinate-information acquiring unit.

The process above allows the user to continuously perform the scroll.

Furthermore, the apparatus of the present invention includes a scroll mode-setting unit, which sets the operation mode on the coordinate-input unit. This allows the user to easily switch between the scrolling operation and other operations to the operation surface.

According to the present invention, when the coordinate-information storage unit stores coordinate-information in which the fourth coordinate-information is acquired previous to the third coordinate-information, the scroll-information generator changes the direction of scroll depending on whether or not the line having the second coordinate and the first coordinate thereon crosses the line that connects the third coordinate and the center point of the circle having the second, third, and fourth coordinates thereon.

Through the process in the scroll-information generator, the direction of scrolling is changed with no interference in the scrolling operation.

The data-processing method of the present invention includes the steps of:

(a) inputting a coordinate.

(b) acquiring coordinate-information including the input coordinate.

(c) storing in sequence the coordinate information into a memory.

(d) calculating an angle defined by a first displacement-vector and a second displacement-vector—where, i) the first displacement-vector represents a displacement from the coordinate given by the second coordinate information to the coordinate given by the first coordinate information; the second displacement-vector represents a displacement from the coordinate given by the third coordinate information to the coordinate given by the second coordinate information; and ii) the newest information is stored as the first coordinate information, and the information acquired previous to the newest is stored as the second coordinate information, similarly, the information acquired previous to the second is stored as the third coordinate information.

(e) determining the direction of scrolling according to the angle calculated above and the amount of scrolling according to the first-displacement vector, thereby generating scroll information (f) performing the scroll according to the scroll information generated above.

DESCRIPTION OF THE EMBODIMENTS

The embodiments of the present invention are described hereinafter with reference to the accompanying drawings.

First Embodiment

Figure 1:
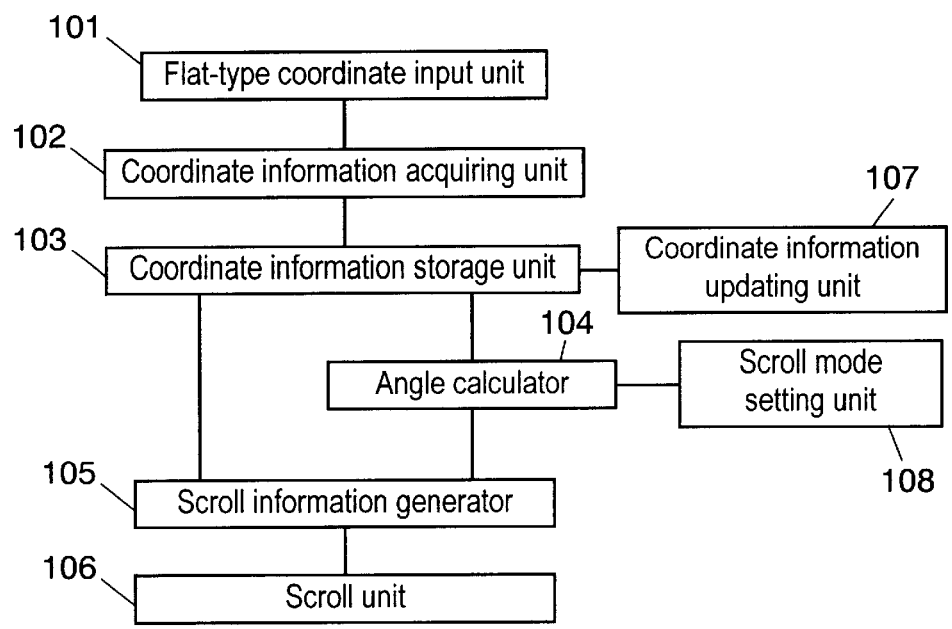
FIG. 1 is a block diagram illustrating a data-processing apparatus in accordance with a first embodiment of the present invention.

FIG. 1 is a block diagram illustrating a data-processing apparatus in accordance with the embodiment of the present invention.

The apparatus of the present invention, as shown in FIG. 1, includes the units below.

Flat coordinate-input unit 101 enters coordinates into the apparatus.

Coordinate-information acquiring unit 102 acquires information including the coordinates fed from input unit 101.

Coordinate-information storage unit 103 stores in sequence the coordinate information obtained by acquiring unit 102.

Using three coordinates stored in sequence in storage unit 103, angle-calculator 104 calculates an angle defined by a first displacement-vector and a second displacement-vector, in which, the first displacement-vector represents a displacement from the firstly stored coordinate as a starting point to the secondly stored coordinate; the second displacement-vector represents a displacement from the secondly stored coordinate as a starting point to the thirdly stored coordinate.

Scroll-information generator 105 determines i) the amount of scrolling from the coordinate information stored in coordinate-information storage unit 103; and ii) the direction of scrolling from the angle obtained by angle calculator 104, thereby generating scroll information.

Scroll unit 106 performs scrolling according to the scroll information generated by scroll-information generator 105.

When coordinate-information acquiring unit 102 acquires new coordinate information, coordinate-information updating unit 107 deletes the oldest one in the coordinate information stored in the coordinate-information storage unit, and then adds the new coordinate-information.

Scroll mode-setting unit 108 sets the operation mode of coordinate-input unit 101.

Figure 2:
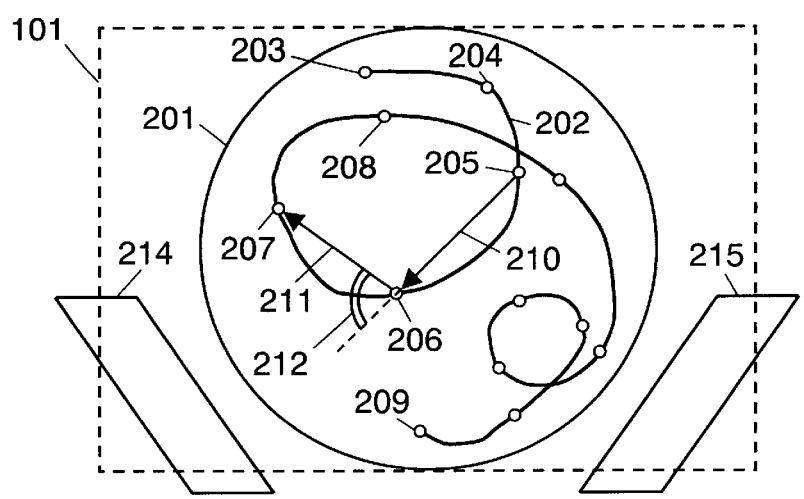
FIG. 2 shows a locus of coordinates input to a flat coordinate-input unit in accordance with the first embodiment.

FIG. 2 shows a locus that is formed by connecting coordinates input to input unit 101 of the embodiment.

In FIG. 2, square and flat coordinate-input unit 101 is covered with a cover having a circular cut-out. The exposed area of unit 101 serves as circular operation surface 201. Left button 214 and Right button 215 are disposed close to circular operation surface 201.

A locus 202 of input coordinates has coordinate 203 as the starting point and coordinate 209 as the endpoint.

Coordinate-information acquiring unit 102 acquires coordinate information corresponding to coordinates 203 to 209 one after another.

Figure 3:
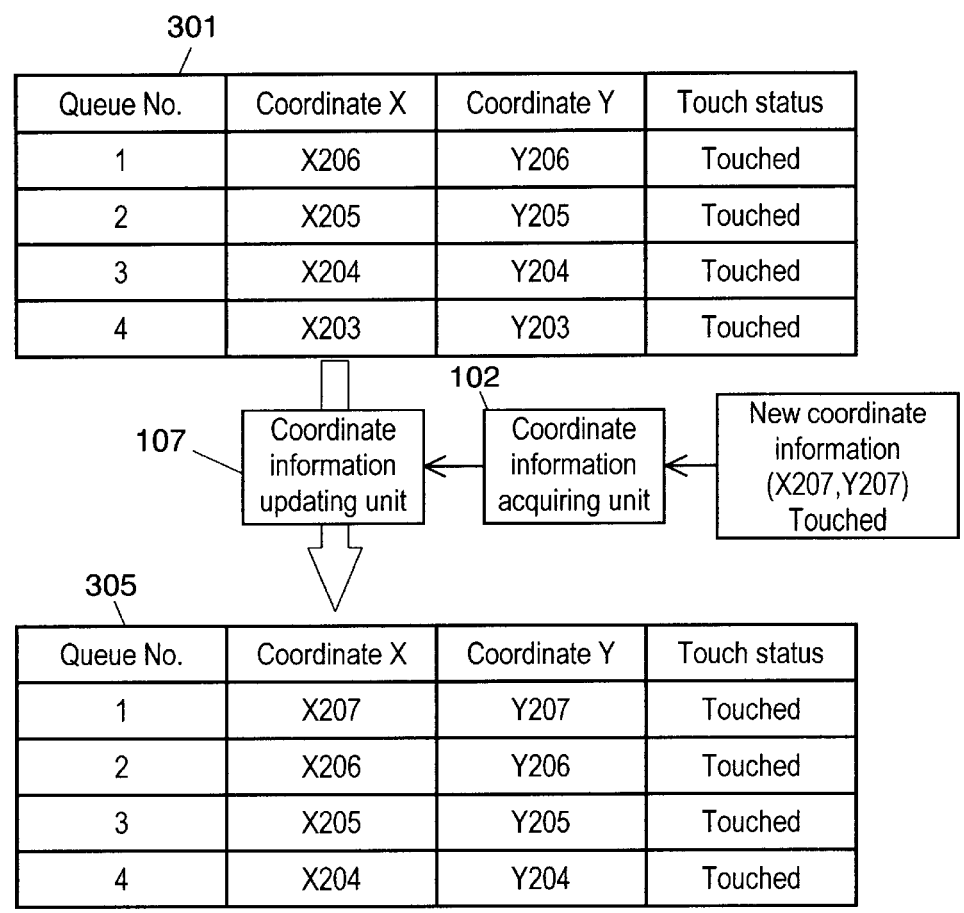
FIG. 3 shows the updating process of coordinate queues stored in the coordinate-information storage unit in accordance with the first embodiment.

FIG. 3 shows the updating process of coordinate queues stored in coordinate-information storage unit 103.

Coordinate queues 301 before updating, as shown in FIG. 3, have four groups of coordinate queue, each includes a queue number, an X-coordinate, a Y-coordinate, and status data of "touched" or "untouched", which are stored in the memory of coordinate-information storage unit 103. Coordinate queues 301 hold coordinate 203 (X203, Y203, "touched") as the queue No. 4; coordinate 204 (X204, Y204, "touched") as the queue No. 3; and coordinate 205 (X205, Y205, "touched") as the queue No. 2; and coordinate 206 (X206, Y206, "touched") as the queue No. 1.

Coordinate queues 301 changes into coordinate queues 305, through the updating process as follows:

1) coordinate-information acquiring unit 102 acquires coordinate 207 (X207, Y207, "touched") newly entered through operation surface 201, 2) coordinate-information updating unit 107 updates coordinate queues 301.

To be more specific, updating unit 107 shifts the coordinate information so that the information having queue numbers 1 through 3 change to have queue numbers 2 through 4, and makes newly input coordinate 207 (X207, Y207, "touched") stored into the emptied space having queue number 1. Coordinate queues 301 are thus updated into coordinate queues 305 by updating unit 107.

Figure 4:
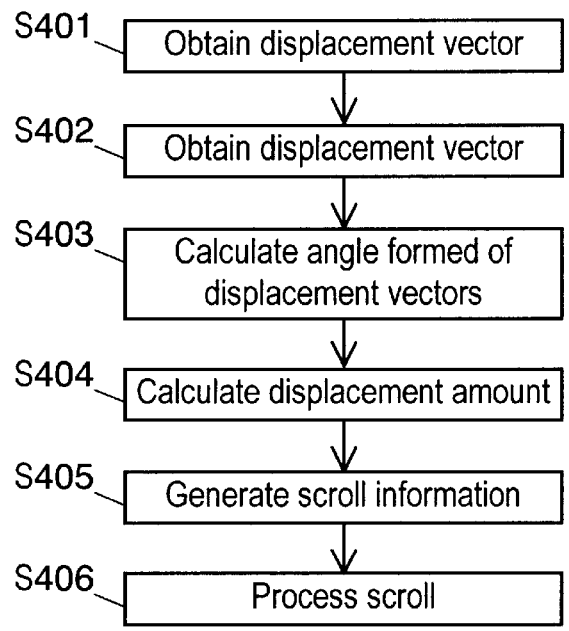
FIG. 4 is a flow chart illustrating the scrolling process in accordance with the first embodiment.

FIG. 4 is a flow chart illustrating the scrolling process in the embodiment.

Now will be described the image-scroll operation in the case that the storage unit 103 holds the coordinate queues 305 as shown in FIG. 3.

In the process of FIG. 4, operations working on operation surface 201 are supposed to be recognized as a scroll operation.

A distinguishable movement, for example, key-input or tapping action on a certain area in operation surface 201, may determine whether the operation on operation surface 201 is to be a scrolling operation or to be a pointer (or, cursor)-move operation.

In step (S) 401, a displacement vector 210 from coordinate 205 (X205, Y205) having queue No. 3 as a starting point to coordinate 206 (X206, Y206) having queue No. 2 vector 210 is obtained as displacement-vector 210.

In S402, a displacement vector which is from coordinate (X206, Y206) having queue No. 2 as a starting point to coordinate (X207, Y207) having queue No. 1 is obtained as displacement-vector 211.

In S403, angle calculator 104 calculates angle 212, which is defined by displacement-vector 210 obtained at S401 and displacement-vector 211 obtained at S402. Angle 212, since it indicates the direction of scrolling, may be represented with a sign: plus (+) or minus (−).

In S404, an amount of displacement from coordinate (X206, Y206) with queue no. 2 as the starting point to coordinate (X207, Y207) with queue No. 1 as the endpoint.

In S405, scroll-information generator 105 generates scroll information from the angle obtained at S403 and the amount of displacement obtained at S404.

In S406, scroll unit 106 performs the window-scroll according to the scroll information generated at S405.

Similarly, between coordinate 208 and coordinate 209 on locus 202, each point is stored as a coordinate to continuously perform scrolling.

Coordinate-information acquiring unit 102 acquires each coordinate on the timing that the user stops the finger or pen at a point on operation surface 201 for a predetermined time when forming the locus as shown in FIG. 2.

In response to the status change from being touched to being untouched, that is, the finger or pen is away from operating surface 201, the window-scroll pauses. When the finger or pen touches down on operating surface 201, the apparatus resumes the scrolling operation from where the image with temporary stop.

The scrolling operation can be continued, as described above, on any given coordinates on the coordinate-input unit. Besides, a desired amount of scrolling can be obtained with no regard to the coordinate representing the center of rotating operation or distance of finger sliding. This provides the user with simple and speedy image-scrolling.

Second Embodiment

The data-processing apparatus of the embodiment has the structure the same as that of the first embodiment.

Figure 5:
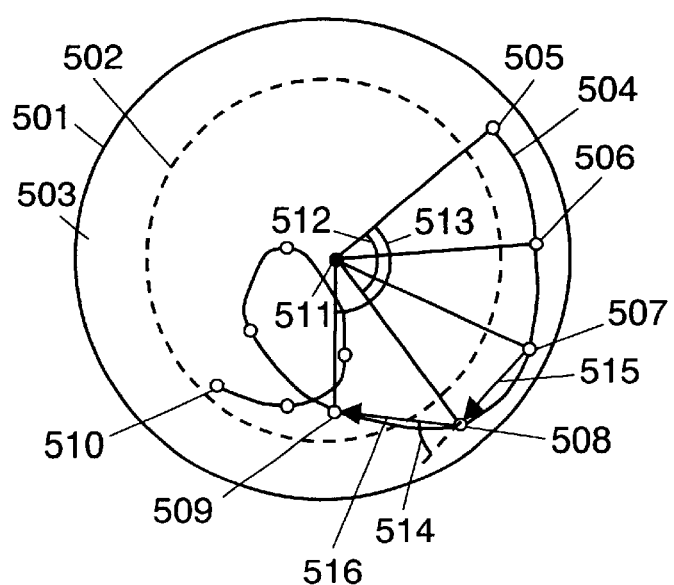
FIG. 5 shows a locus connecting coordinates input to a flat coordinate-input device in accordance with the second embodiment.

FIG. 5 shows a locus connecting coordinates entered to flat coordinate-input unit 101 of the embodiment.

FIG. 5 also shows surface 501 and gesture area 502. "Gesture" generally means a movement of a part of the body, especially the hand, intended to move the pointer or cursor by forming a specific pattern in a specific direction for a specific time.

Herein, "gesture" means a movement in which the user touches operation surface 501 with the finger or pen to perform an action representing a specific command or function, or to draw a predetermined locus on the surface.

The specific commands and functions include frequently used commands, such as "cut", "paste", and "save".

"Gesture area" means the range in which an operation is recognized as a gesture.

In gesture-starting area 503, a locus for inputs is recognized as a gesture.

Locus 504 formed by a gesture has coordinate 505 as the starting point and coordinate 510 as the endpoint. Coordinate-information acquiring unit 102 in sequence acquires information of coordinate 505 through 510.

Fixed point 511 serves as a reference point, with which each relationship of the displacement-vector between coordinates is determined.

Angle calculator 104 calculates an angle formed by the displacement-vectors each of which connects consecutively entered two coordinates.

Figure 6A:
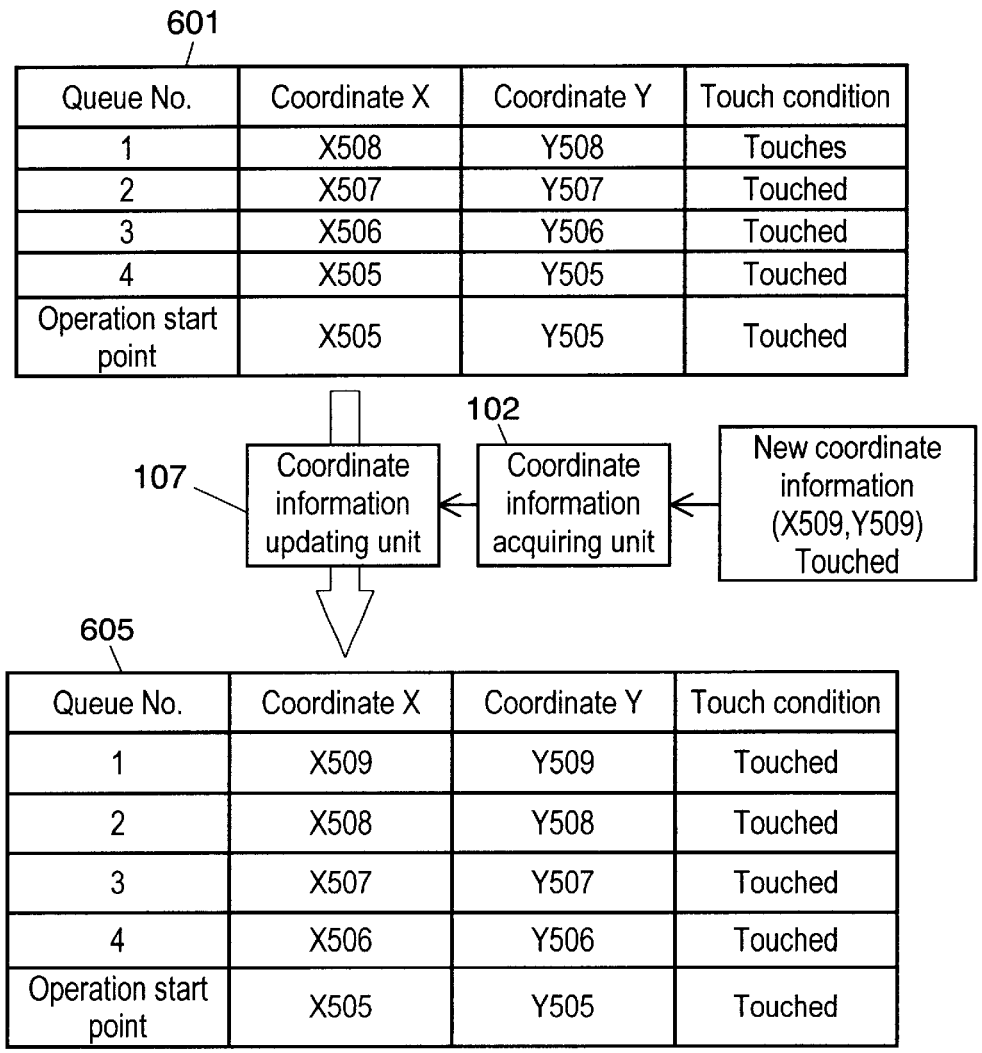
FIG. 6A shows the updating process of coordinate queues stored in the coordinate-information storage unit in accordance with the second embodiment.

FIG. 6A shows the updating process of coordinate queues stored in coordinate-information storage unit 103.

Figure 6B:
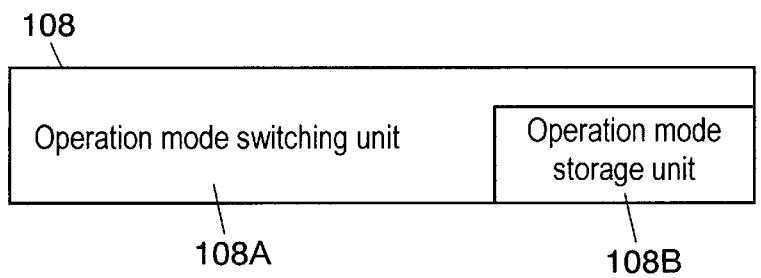
FIG. 6B shows the structure of the scroll-mode setting unit.

FIG. 6B shows the structure of the scroll mode setting unit 108.

Coordinate queues 601 holds the coordinate information below: coordinate 505 (X505, Y505, "touched") as the gesture-starting point, as well as the information having queue No. 4; coordinate 506 (X506, Y506, "touched") with queue No. 3; coordinate 507 (X507, Y507, "touched") with queue No. 2; and coordinate 508 (X508, Y508, "touched") with queue No. 1.

When operation surface 501 accepts new input, i.e., coordinate 509 (X509, Y509, "touched"), coordinate-information acquiring unit 102 acquires the information. Adding the newly entered information, coordinate information updating unit 107 changes the coordinate information held by coordinate queues 601 into that held by queues 605.

Scroll mode-setting unit 108 switches the following two modes:

i) the operation to operation surface 501 is recognized as a "scroll", ii) the operation is recognized as a "gesture".

Scroll mode setting unit 108 includes operation mode-switching unit 108A and operation mode-storage unit 108B. Storage unit 108B has a memory having operation mode-storage area into which a use for the operation is stored as either the scrolling or the gesturing at a time of each operation.

The operation mode-switching process will be described in detail hereinafter.

When operation mode-switching unit 108A determines that an operation mode is a "gesture", operation mode-storage unit 108B stores the operation mode as a gesture.

When coordinate 508 are input through operation surface 501, angle "A" indicated as angle 512 is formed by i) the line connecting fixed point 511 and coordinate 505 (X505, Y505) which is the operation-starting point as shown in coordinate queues 601 and ii) the line connecting fixed point 511 and coordinate 508 (X508, Y508) with queue No. 1. Suppose that angle "A" 512 is not greater than predetermined reference angle "S".

In this case, all the coordinates, that is, coordinate 505 as the starting point and coordinates designated by queue numbers 1 to 4, exist in gesture-starting area 503. Scroll-mode setting unit 108 does not change the operation mode. Accordingly, operation mode storage unit 108B maintains "gesture" as the mode.

In response to the input of coordinate 509 successive to coordinate 508 through operation surface 501, coordinate-information updating unit 107 updates coordinate queues 601 into queues 605.

Angle "B" (indicated as angle 513) is formed by i) the line connecting fixed point 511 and coordinate 505 (X505, Y505) which is the starting point as shown in coordinate queues 605 and ii) the line connecting fixed point 511 and coordinate 509 (X509, Y509) held by queue No. 1. Suppose that angle "B" is greater than predetermined reference angle "S". In this case, scroll mode setting unit 108 switches the operation mode. Accordingly, mode storage unit 108B stores "scroll" as the operation mode.

The process above allows the user to easily switch the operation to the operation surface from the gesture to the scroll.

Figure 7:
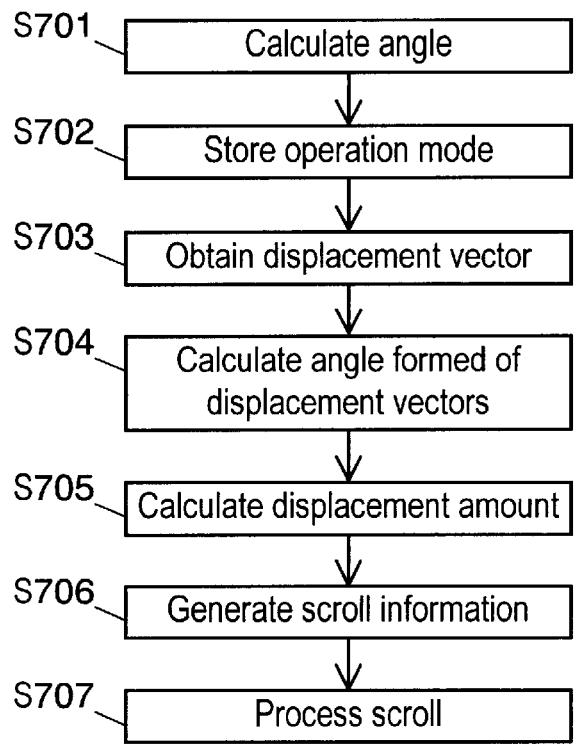
FIG. 7 is a flow chart illustrating the scrolling process in accordance with the second embodiment.

FIG. 7 is a flow chart illustrating the scrolling process of the embodiment.

Here will be described the scrolling process in which the coordinate queues hold the information as shown in queues 605 of FIG. 6A.

In S701 in FIG. 7, angle calculator 104 calculates angle "B" (indicated as angle 513 in FIG. 5), which is formed by i) the line connecting between fixed point 511 and coordinate 509 (X509, Y509) having queue No. 1 and ii) the line connecting fixed point 511 and coordinate 505 (X505, Y505) as the operation-starting point. Calculator 104 obtains angle "B" 513 that is greater than angle In S702, as "B" 513 calculated in S701 is greater than angle "S", scroll-mode setting unit 108 switches the operation mode. Operation mode-storage unit 108B stores "scroll" as the operation mode.

In S703, scroll-information generator 105 obtains displacement-vector 515. Vector 515 represents the displacement from coordinate 507 (X507, Y507) having queue No. 3 as a starting point to coordinate 508 (X508, Y508) having queue No. 2. Similarly, generator 105 obtains displacement-vector 516, which represents the displacement from coordinate 508 (X508, Y508) having queue No. 2 as a starting point to coordinate 509 (X509, Y509) having queue No. 1.

In S704, angle calculator 104 calculates angle 514 formed of displacement-vectors 515 and 516 obtained in S703.

In S705, scroll-information generator 105 calculates an amount of displacement between coordinate 508 (X508, Y508) having queue No. 2 as the starting point and coordinate 509 (X509, Y509) having queue No. 1 as the endpoint.

In S706, generator 105 generates scroll information according to the angle obtained in S704 and the amount of displacement obtained in S705.

In S707, scroll unit 106 performs the scroll process according to the scroll information generated in S706.

Figure 8:
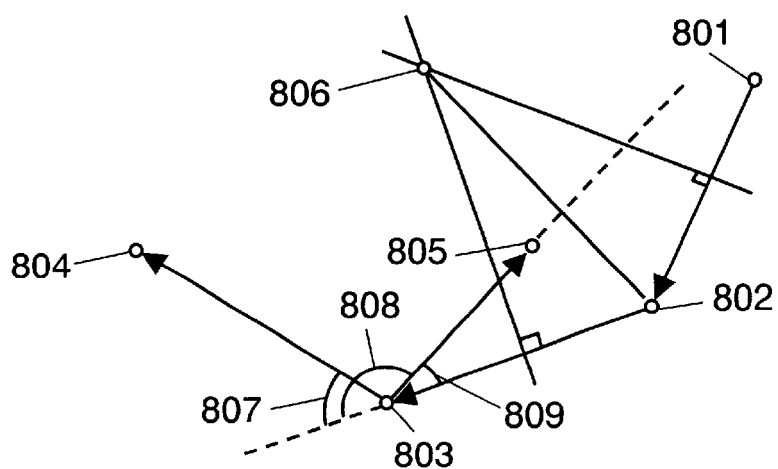
FIG. 8 shows a plan view illustrating coordinates stored in the coordinate queues, when it is determined whether an operation is for reversing the direction of scrolling or it is for others, during scrolling in accordance with the second embodiment.

FIG. 8 shows, in a plan view, coordinates stored in the coordinate queues, when it is determined whether an operation is for reversing the direction of scrolling or it is for others.

Coordinates 801, 802, 803 are stored in portions designated by queue numbers 4, 3, 2, respectively, and coordinate 804, which is obtained as the latest information, is stored in a portion designated by queue number 1.

In FIG. 8, point 806 is the center of a circle including coordinate 803 with queue No. 2, coordinate 802 with queue No. 3, and coordinate 801 with queue No. 4.

1) The line having coordinate 803 with queue No. 2 and coordinate 804 with queue No. 1 thereon does not cross the line that connects center 806 and coordinate 802 with queue No. 3.

In this case, angle 807 calculated in angle calculator 104 is determined as the angle indicating the direction of scrolling.

2) Suppose that newly obtained coordinate information, which is designated with queue No. 1, is coordinate 805. The line having coordinate 803 with queue No. 2 and coordinate 803 with queue No. 1 thereon crosses the line that connects center 806 and coordinate 802 with queue No. 3.

In this case, angle 809, which is obtained by subtracting angle 808 calculated by angle calculator from 180°, determines the direction of scrolling.

In this way, the direction of scrolling is changed with no interference in the scrolling operation.

Figure 9:
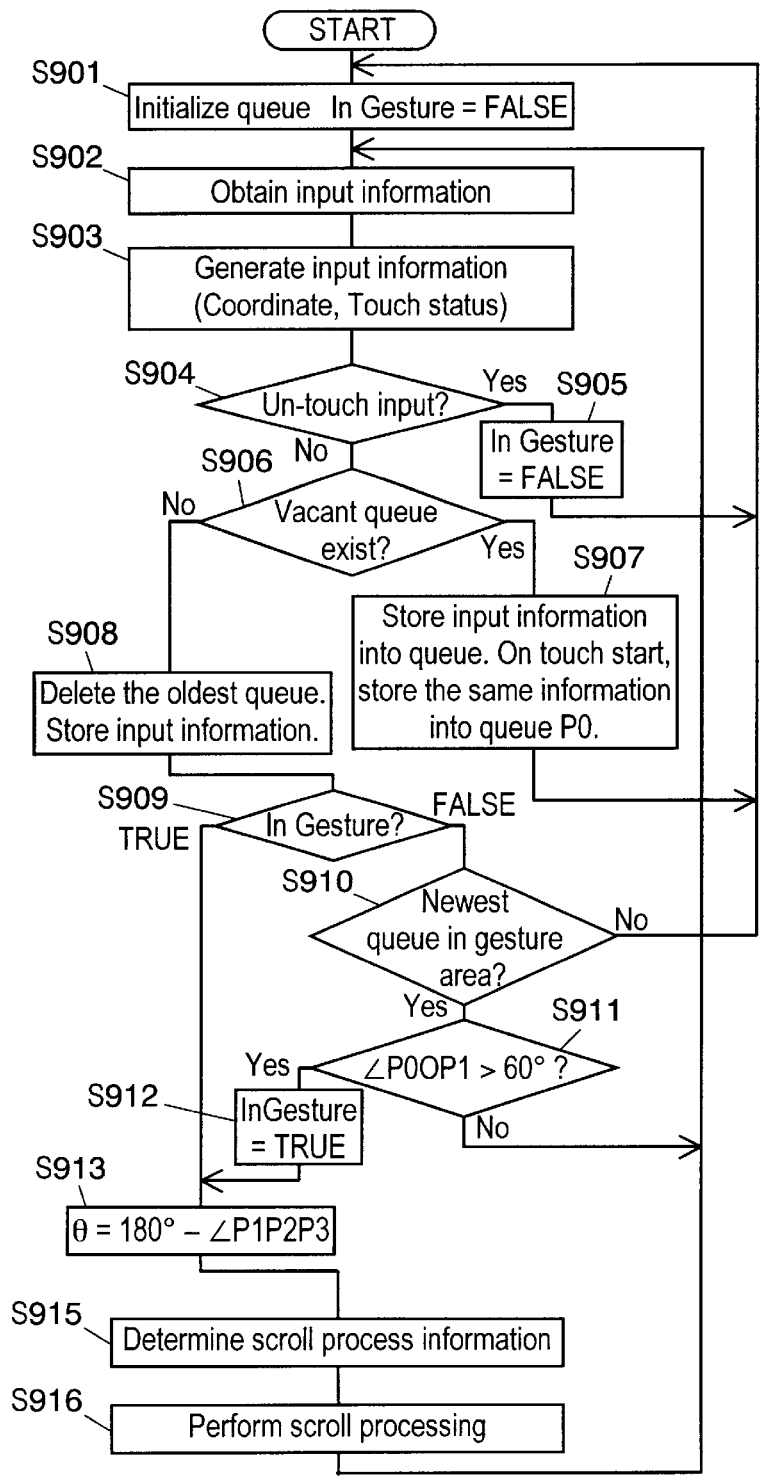
FIG. 9 is a flow chart illustrating the gesture operation process in accordance with the second embodiment.

FIG. 9 is a flow chart illustrating the process of gesture operation of the embodiment.

In step (S) 901, the queue table is emptied and "FALSE" is set in the "InGesture" variable that indicates the operation mode. The setting defines the operation mode as an ordinary touch pad input other than "gesture".

In S902, input X, Y coordinates and status information of "touched" or "untouched" is obtained.

In S903, input information including the coordinate and the status information is generated according to the result obtained in S902.

In S904, if the status information is "untouched", the procedure goes to S905, otherwise goes to S906.

In S905, "FALSE" is set into the "InGesture" variable.

In S906, if the queue table has a vacancy, the procedure goes to S907, otherwise goes to S908.

In S907, the coordinate and status information obtained at S903 is stored into queue P1 that stores the latest input information, and queue P0 that stores the input information indicating starting operation. Only when "the status of "touched" is started, the information is stored into P0.

In S908, the information stored in queue P4 is deleted, and the queues P1 through P3 has one-shift each, i.e., they move to P2 through P4. The coordinate and status information obtained at S903 is stored into queue P1.

In S909, the content of the "InGesture" variable is judged—if the variable holds the information of "TRUE", the procedure goes to S913; and if the information is "FALSE", the procedure goes to S910.

In S910, if the coordinate stored in queue P1 stay in a predetermined gesture-area, the procedure proceeds to S911. Otherwise, the procedure goes back to S901.

In S911, if ∠P0OP1 is greater than 60°, the procedure proceeds to S912. Otherwise, goes back to S901. Herein, the coordinate stored in queue P0, predetermined fixed point "O", and the coordinate stored in queue P1 form the angle ∠P0OP1.

In S912, "TRUE" is set into the "InGesture" variable. The setting indicates the operation mode as "gesture".

In S913, angle θ that indicates the direction of scrolling is calculated. Herein, θ=180°−∠P1P2P3, where, ∠P1P2P3 is the angle defined by the coordinates stored in queues P1, P2, and P3.

In S915, the scrolling operation is determined according to angle θ indicating the direction of scrolling.

In S916, the scroll process based on angle θ indicating the direction of scrolling is performed.

Figure 10:
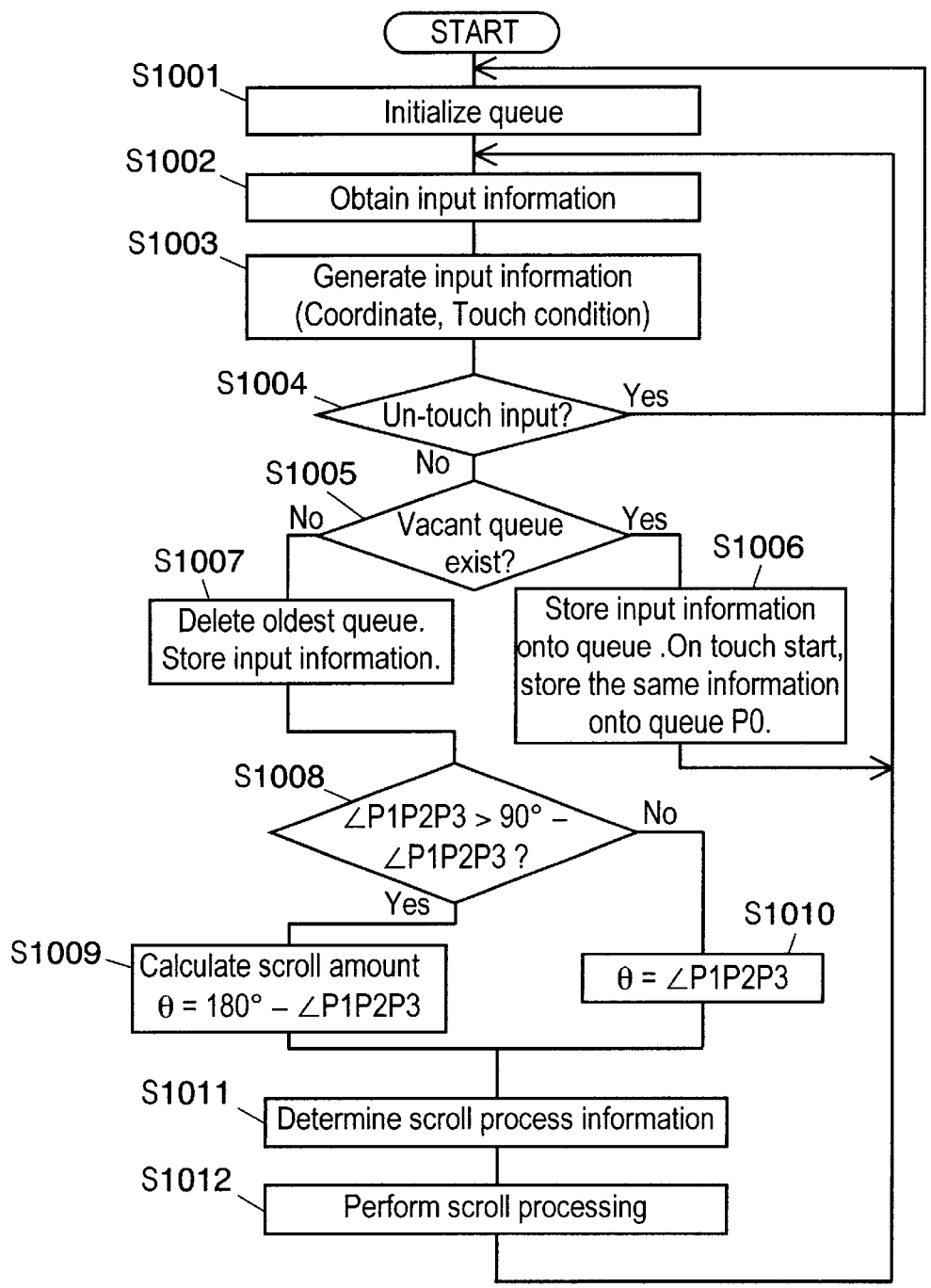
FIG. 10 is a flow chart illustrating the process of changing the direction of scrolling in accordance with the second embodiment.

FIG. 10 is a flow chart illustrating the process of changing the direction of scrolling of the embodiment.

In S1001, the queue table is emptied as the initializing process.

In S1002, input coordinates and status information of "touched" or "untouched" is obtained.

In S1003, input information including the coordinates and the status of "touched" or "untouched" is generated according to the result obtained in S1002.

In S1004, if the status information generated at S1003 is untouched, the procedure goes back to S1001. Otherwise the procedure proceeds to S1005.

In S1005, if the queue table has a vacancy, the procedure goes to S1006, otherwise goes to S1007.

In S1006, the coordinate and status information obtained at S1003 are stored into queue P1 that stores the latest input information, and queue P0 that stores the input information indicating starting operation.

In S1007, the information stored in queue P4 is deleted, and the queues P1 through P3 make one-shift to P2 through P4. The coordinate and status information obtained at S1003 is stored into queue P1.

In S1008, if ∠P1P2P3 is greater than (90°−∠P1P2P3), the procedure goes to S1009. Otherwise, the procedure goes to S1010.

In S1009, angle θ that indicates the direction of scrolling is calculated. Herein, θ=180°−∠P1P2P3.

In S1010, angle θ indicating the direction of scrolling is determined as −∠P1P2P3.

In S1011, the scrolling operation is determined according to angle θ indicating the direction of scrolling.

In S1012, the scroll based on angle θ indicating the direction of scrolling is performed.

According to the apparatus and method of processing data, as described above, the user can continuously perform the scrolling with less number of operations on the flat coordinate-input device.

What is claimed is:

1. A data-processing apparatus comprising:
   (a) a flat coordinate-input unit for inputting coordinates;
   (b) a coordinate-information acquiring unit for acquiring coordinate information including a coordinate input from the flat coordinate-input unit;
   (c) a coordinate-information storage unit for storing in sequence the coordinate information;
   (d) an angle-calculator for calculating an angle defined by a first displacement-vector and a second displacement-vector, in which, i) the first displacement-vector represents a displacement from a second coordinate given by a second coordinate information to a first coordinate given by first coordinate information, the second displacement-vector represents a displacement from a third coordinate given by a third coordinate information to the second coordinate, and ii) the first coordinate information is a newest information, the second coordinate information is second newest information, and the third coordinate information is third newest information, stored into the coordinate storage unit;
   (e) a scroll-information generator for generating scroll information by determining a direction of scrolling based on the angle calculated by the angle-calculator and an amount of scrolling derived from the first-displacement vector; and
   (f) a scroll unit for performing scroll according to the scroll information.

2. The data-processing apparatus of claim 1 further comprising:
   (g) a coordinate-information updating unit for deleting a most previously stored coordinate information in the coordinate-data storage unit in response to acquisition of another coordinate information by the coordinate-information acquiring unit, and for adding the another coordinate-information to the coordinate-information storage unit.

3. The data-processing apparatus of claim 1 further comprising:
   (h) a scroll-mode setting unit,
   wherein the coordinate-information storage unit retains coordinate-information which is acquired by the coordinate-information acquiring unit at time that a status receiving the input coordinate-information becomes a touched-status from an untouched-status, as operation-starting coordinate-information, and when the coordinate-information acquiring unit acquires another coordinate-information, if an angle formed by i) a displacement-vector from a predetermined coordinate to a coordinate given by said another coordinate-information and ii) a displacement-vector from the predetermined coordinate to a coordinate given by the operation-starting coordinate-information, is greater than a predetermined angle, the scroll-mode setting unit sets an input mode for the flat coordinate-input unit as a scroll mode.

4. The data-processing apparatus of claim 1, wherein in case that a fourth coordinate-information is stored previous to the third coordinate-information in the coordinate-information storage unit, the scroll-information generator changes a direction of the scroll depending on whether or not a line including the second coordinate and the first coordinate crosses a line that connects the third coordinate and a center point of a circle including the second coordinate, the third coordinate, and a fourth coordinate given by the fourth coordinate-information.

5. The data-processing apparatus of claim 2 further comprising:
   (h) a scroll-mode setting unit,
   wherein the coordinate-information storage unit retains coordinate-information which is acquired by the coordinate-information acquiring unit at time that a status receiving the input coordinate-information becomes a touched-status from an untouched-status, as operation-starting information, and when the coordinate-information acquiring unit acquires another coordinate information, if an angle formed by i) a displacement-vector from a predetermined coordinate to a coordinate given by the another coordinate information and ii) a displacement-vector from the predetermined coordinate to a coordinate given by the operation-starting information, is greater than a predetermined angle, the scroll-mode setting unit sets an input mode for the flat coordinate-input unit as a scroll mode.

6. The data-processing apparatus of claim 2, wherein in case that a fourth coordinate-information is stored previous to the third coordinate-information in the coordinate-information storage unit, the scroll-information generator changes a direction of scrolling depending on whether or not a line including the second coordinate and the first coordinate crosses a line that connects the third coordinate and a center point of a circle including the second coordinate, the third coordinate, and a fourth coordinate given by the fourth coordinate-information.

7. The data-processing apparatus of claim 3, wherein in case that a fourth coordinate-information is stored previous to the third coordinate-information in the coordinate-information storage unit, the scroll-information generator changes a direction of scrolling depending on whether or not a line including the second coordinate and the first coordinate crosses a line that connects the third coordinate and a center point of a circle including the second coordinate, the third coordinate, and a fourth coordinate given by the fourth coordinate-information.

8. The data-processing apparatus of claim 5, wherein in case that a fourth coordinate-information is stored previous to the third coordinate-information in the coordinate-information storage unit, the scroll-information generator changes a direction of scrolling depending on whether or not a line including the second coordinate and the first coordinate crosses a line that connects the third coordinate and a center point of a circle including the second coordinate, the third coordinate, and a fourth coordinate given by the fourth coordinate-information.

9. A data-processing method comprising the steps of:
   (a) inputting a coordinate;
   (b) acquiring coordinate-information including the input coordinate;
   (c) storing in sequence the coordinate-information into a memory;
   (d) calculating an angle defined by a first displacement-vector and a second displacement-vector, in which, the first displacement-vector represents a displacement from the second coordinate given by a second coordinate information to a first coordinate given by a first coordinate information, the second displacement-vector represents a displacement from a third coordinate given by a third coordinate information to the second coordinate, wherein the first coordinate information is newest information, the second coordinate information is second newest information, and the third coordinate information is third newest information, stored in step (c);
   (e) generating scroll information by determining of i) a direction of a scroll derived from the angle and ii) an amount of the scroll derived from the first-displacement vector; and
   (f) performing the scroll according to the scroll information.

10. The data-processing method of claim 9 further comprising the step of:
    (g) deleting a most previously acquired information out of the coordinate information stored in the memory, in response to acquisition of another coordinate information in step (b), and adding said another coordinate-information into the memory.

11. The data-processing method of claim 9 further comprising the step of:
    (h) setting a scroll-mode for performing the scroll,
    wherein the coordinate-information, which is acquired in step (b) at a time that a status receiving the input coordinate becomes touched-status from untouched-status, is retained as operation-starting coordinate-information, and when another coordinate-information is acquired in step (b), an angle formed by i) a displacement-vector from a predetermined coordinate to a coordinate given by said another coordinate-information and ii) a displacement-vector from the predetermined coordinate to a coordinate given by the operation-starting coordinate information, is greater than the predetermined angle, the scroll mode is set in step (h).

12. The data-processing method of claim 9, wherein in case a fourth coordinate-information is stored previous to the third coordinate-information into the memory, a direction of the scroll changes depending on whether or not a line having the second coordinate and the first coordinate crosses a line that connects the third coordinate and a center point of a circle including the second coordinate, the third coordinate, and a fourth coordinate given by the fourth coordinate-information.

13. The data-processing method of claim 10 further comprising the step of:
    (h) setting a scroll-mode for performing the scroll,
    wherein the coordinate-information, which is acquired in step (b) at a time that a status receiving the input coordinate becomes touched-status from untouched-status, is retained as operation-starting coordinate-information, and when another coordinate-information is acquired in step (b), an angle formed by i) a displacement-vector from a predetermined coordinate to a coordinate given by said another coordinate-information and ii) a displacement-vector from the predetermined coordinate to a coordinate given by the operation-starting coordinate information, is greater than the predetermined angle, the scroll mode is set in step (h).

14. The data-processing method of claim 10, wherein in case a fourth coordinate-information is stored previous to the third coordinate-information into the memory, a direction of the scroll changes depending on whether or not a line having the second coordinate and the first coordinate crosses a line that connects the third coordinate and a center point of a circle including the second coordinate, the third coordinate, and a fourth coordinate given by the fourth coordinate-information.

15. The data-processing method of claim 11, wherein in case a fourth coordinate-information is stored previous to the third coordinate-information into the memory, a direction of the scroll changes depending on whether or not a line having the second coordinate and the first coordinate crosses a line that connects the third coordinate and a center point of a circle including the second coordinate, the third coordinate, and a fourth coordinate given by the fourth coordinate-information.

16. The data-processing method of claim 13, wherein in case a fourth coordinate-information is stored previous to the third coordinate-information into the memory, a direction of the scroll changes depending on whether or not a line having the second coordinate and the first coordinate crosses a line that connects the third coordinate and a center point of a circle including the second coordinate, the third coordinate, and a fourth coordinate given by the fourth coordinate-information.

* * * * *

UNITED STATES PATENT AND TRADEMARK OFFICE
CERTIFICATE OF CORRECTION

PATENT NO. : 6,771,280 B2
DATED : August 3, 2004
INVENTOR(S) : Fujisaki et al.

It is certified that error appears in the above-identified patent and that said Letters Patent is hereby corrected as shown below:

<u>Title page,</u>
Item [56], References Cited, FOREIGN PATENT DOCUMENTS, insert
-- JP 2002-222034 08/2002 --.

Signed and Sealed this

Twenty-sixth Day of April, 2005

JON W. DUDAS
*Director of the United States Patent and Trademark Office*